May 20, 1930. J. J. PETERS 1,759,589
PIE PLATE
Filed Nov. 3, 1928
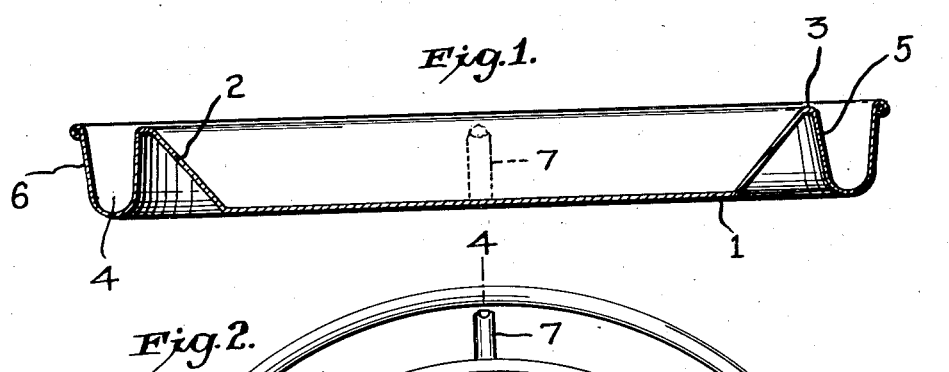
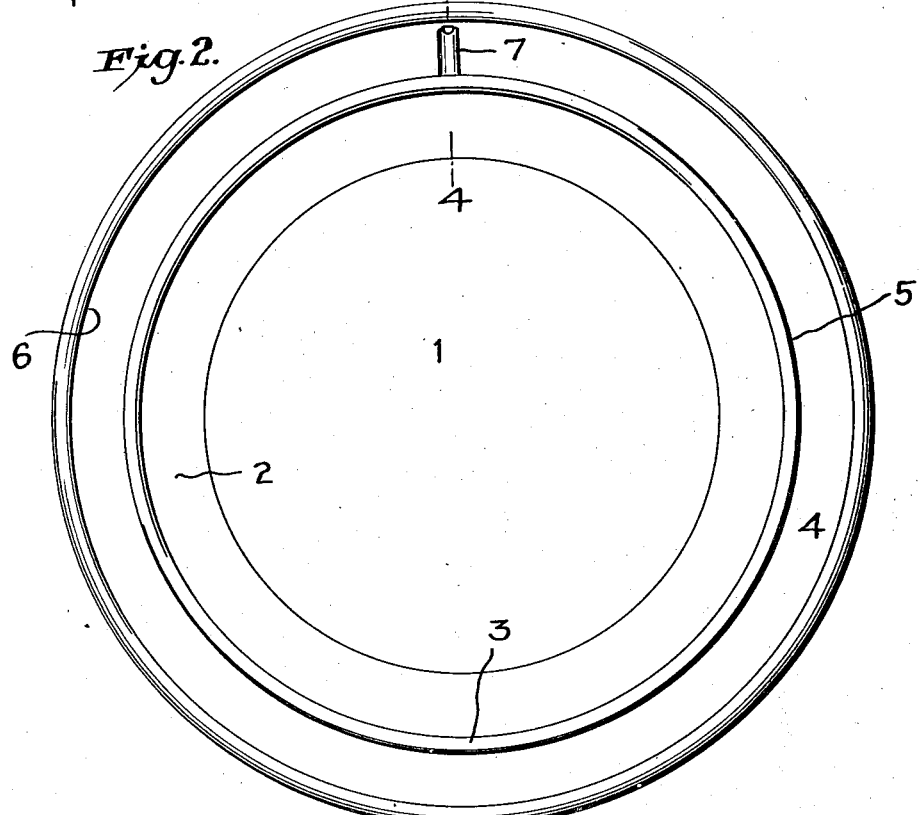
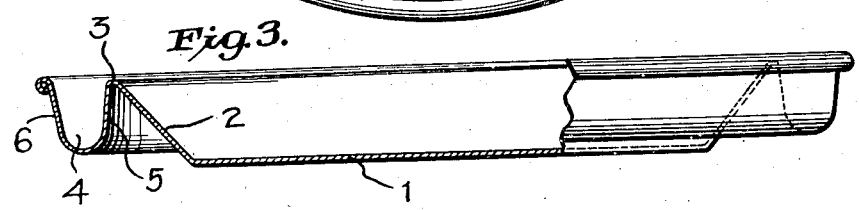
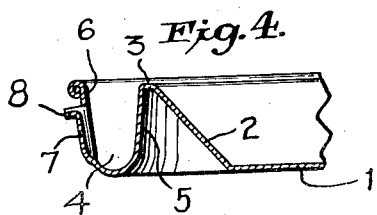

Patented May 20, 1930

1,759,589

UNITED STATES PATENT OFFICE

JOHN J. PETERS, OF NEW YORK, N. Y.

PIE PLATE

Application filed November 3, 1928. Serial No. 316,971.

My invention relates to pie plates used in cooking and more particularly to a pie plate having a gutter which will receive the juice which overflows from the pie when the pie is being cooked and which is provided with a lip so that the juice may be readily returned to the pie.

One of the objects of the invention is to provide, integral with the pie plate, a gutter which surrounds the plate and which, in the preferred form of the invention, will permit the bottom of the pie plate to rest in contact with the baking part of the oven and will, itself, come into contact with the baking surface and thus maintain a rigid, integral pie plate and gutter which is stable and will firmly rest on the baking surface while the pie is being cooked.

Another object of the invention is to provide a lip, struck from the gutter, which will serve as a drain, so that the fruit juices which overflow from the pie into the gutter may be drained from the gutter and returned to the pie, thus preserving the pie in its juicy condition.

With the above and other objects in view, my invention consists in the parts, improvements and combinations more fully pointed out hereinafter.

Referring now to the drawings:

Figure 1, is a transverse section of my improved pie plate and gutter,

Figure 2, is a plan view of the same,

Figure 3, is a transverse section of another form of the invention, and

Figure 4, is a transverse sectional detail of the form shown in Figure 1, showing the lip serving as a drain.

In accordance with my invention, I provide a pie plate with means, comprising an integral gutter, for saving the overflow juices, so that the juices may be returned to the pie when baked and preserve its juicy condition. The gutter of the pie plate is so constructed and arranged that it will hold all the overflow fruit juices from the pie while the pie is being baked, will not unduly increase the diameter of the pipe plate and will not raise the bottom of the pie plate from the baking surface of the oven.

As illustrated in the drawings, my pie plate comprises the usual baking bottom 1, and a circular, upwardly extending, outwardly sloping flange 2. The flange, as shown, is bent at 3, upon which the edge of the pie crust rests and then reversely bent at 3ª. The transversely bent portions of the flange 2, formed an integral gutter 4, surrounding the pie plate, one portion of the flange forming the inner wall 5 and the other portion of the flange forming an upwardly-extending outer wall 6, the outer wall being higher than the inner wall of the gutter. It is desirable that the diameter of the pie plate be not unduly increased, so that a number of pies may be baked in an oven at the same time. For this reason the width of the gutter is comparatively narrow. The depth of the gutter, as shown, is greater than its width. The higher outer wall of the gutter prevents the juices from overflowing the gutter to the range or oven floor. The gutter is constructed of a depth sufficient to hold all the juices overflowing from the pie, so that the pie plate and pie do not have to be removed from the oven before the pie is completely baked. The gutter is, accordingly, of a depth at least substantially one half of the depth of the pie plate. In the preferred form of the invention, illustrated in Figure 1, the depth of the gutter 4, is the same as that of the pie plate, so that both the gutter and the baking bottom will rest on the floor of the oven and provide a stable pie plate which will firmly rest on the baking surface of the oven while the pie is being baked.

The construction of the flange or side wall of the pie plate and the inner wall of the gutter are such that a heat retaining space is provided, extending around the pie plate.

In accordance with my invention means are provided for draining the overflow juices from the gutter so that they may be returned to the pie when baked and so preserve the pie in its juicy condition.

As illustrated the outer wall 6 of the gutter is provided with a vertical groove 7, stamped in the inner face of the wall 6, the upper end of the groove leads to a lip 8, stamped out of the wall 6, and projecting outwardly therefrom. The overflow juices which run into the gutter from the pie may thus be drained from the gutter by means of the groove and lip in the outside wall of the gutter, into a suitable receptacle, and then returned to the pie, to preserve its juicy condition.

The provision of my gutter integral with the pie plate not only insures the saving of the fruit juices of the pie and the preservation of the pie in its desired juicy condition, but also avoids the overflow of the pie juices from the pie plate to the range or floor of the oven, as ordinarily where it burns and creates disagreeable odors, and cakes on the range or oven making it difficult to keep the range or oven clean.

It is to be noted that the flange 2 constitutes a rim for the plate and that the walls 5 and 6 are themselves not only closely related but also the wall 5 extends in juxtaposition to the rim 2. The upper ends of the walls 5 and 6 moreover extend substantially flush with the top of the rim 2 while the bottom of the gutter is disposed in close proximity to the bottom 1 of the plate. The rim and the walls 5 and 6 extend moreover in substantially straight lines, and also due to their close relation not only present a strong structure in which the parts mutually contribute to brace and reinforce one another, but also one in which manufacture can be economically effected. In addition it will be noted that this structure enables the plates to be compactly stacked. The diameter of the plate is moreover maintained at minimum as compared to plates of ordinary and well known manufacture. Further, by virture of the bottom of the gutter extending substantially flush with the bottom of the plate, tilting of the plate is prevented, and in further addition a heat confining pocket of maximum and effective depth is afforded between the rim 2 and the wall 5.

Having thus described the invention, its operation will be clear. The pie is placed in the pie plate, which is then placed in the oven. The bottom of the pie plate is in contact with the floor of the oven to insure proper browning of the pie. As the pie is baked the juices which flow from the pie flow into the gutter of the pie plate, the higher outside wall of the gutter, preventing the juices from overflowing the gutter onto the range or oven. The depth of the gutter is such that it will hold all the overflow juices so that the pie can be completely baked without removal from the oven. After the pie is baked and the plate withdrawn from the oven, the overflow juices now in the gutter may be drained from the gutter by means of the groove and lip in the outer wall of the gutter, into a receptacle and then returned to the pie to preserve its juicy condition. It will, of course, be understood that changes may be made in carrying the invention into effect, without departing from the principle thereof.

What I claim is:

A pie plate composed of a bottom formed to rest on the floor of a baking oven and having an integral circular upwardly extended flange which is inclined outwardly to form a rim for the bottom, said rim being then extended downwardly to provide a combined gutter-forming and heat-confining wall which cooperates with and lies opposite to and is spaced from the rim to confine heat between the rim and wall, said wall being then extended outwardly to form a gutter bottom which lies in substantially the plane of the plate bottom and being finally extended upwardly to form the other wall of the gutter, said walls of the gutter and said rim extending in substantially straight lines and the walls of the gutter being approximately parallel and extending from substantially the plate bottom to the top of the rim to form a gutter of capacity in depth substantially equalling the depth of the plate and being closely related so that the gutter is of maximum capacity and with but relatively slight increase of the diameter of the plate.

In testimony whereof, I have signed my name to this specification.

JOHN J. PETERS.